A. W. CARLSON.
NUT TAPPING MACHINE.
APPLICATION FILED JULY 23, 1914.
1,230,113.
Patented June 19, 1917.
6 SHEETS—SHEET 1.
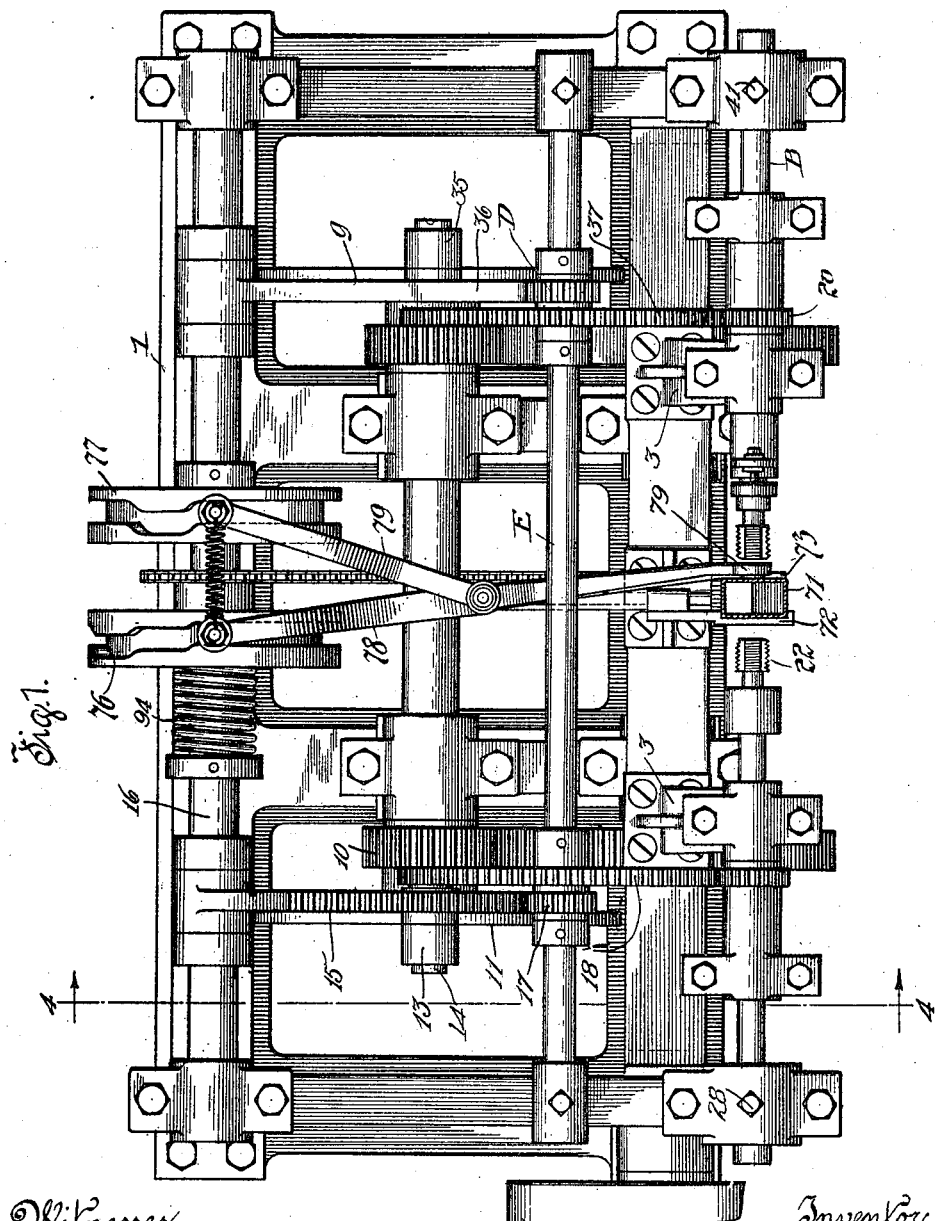

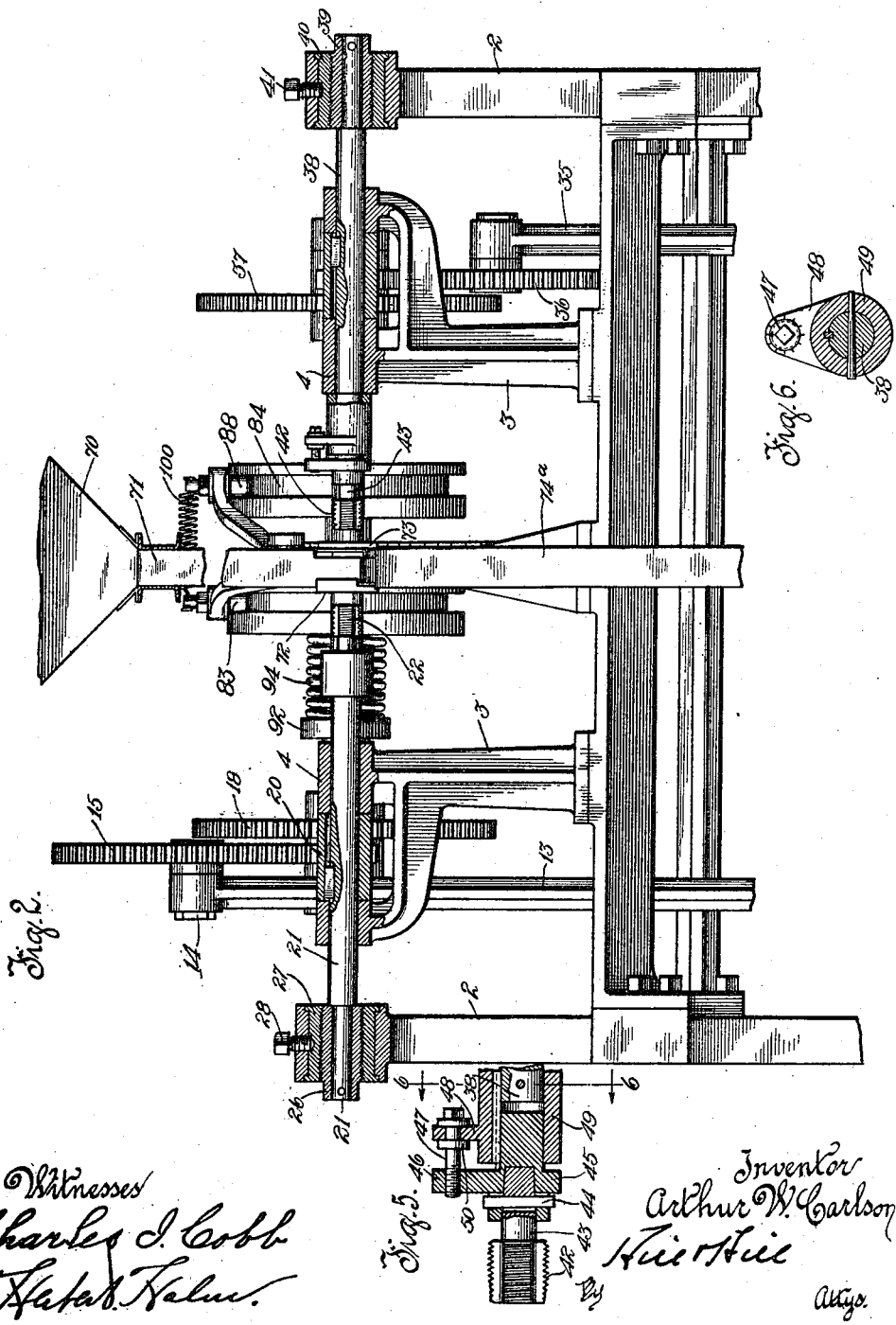

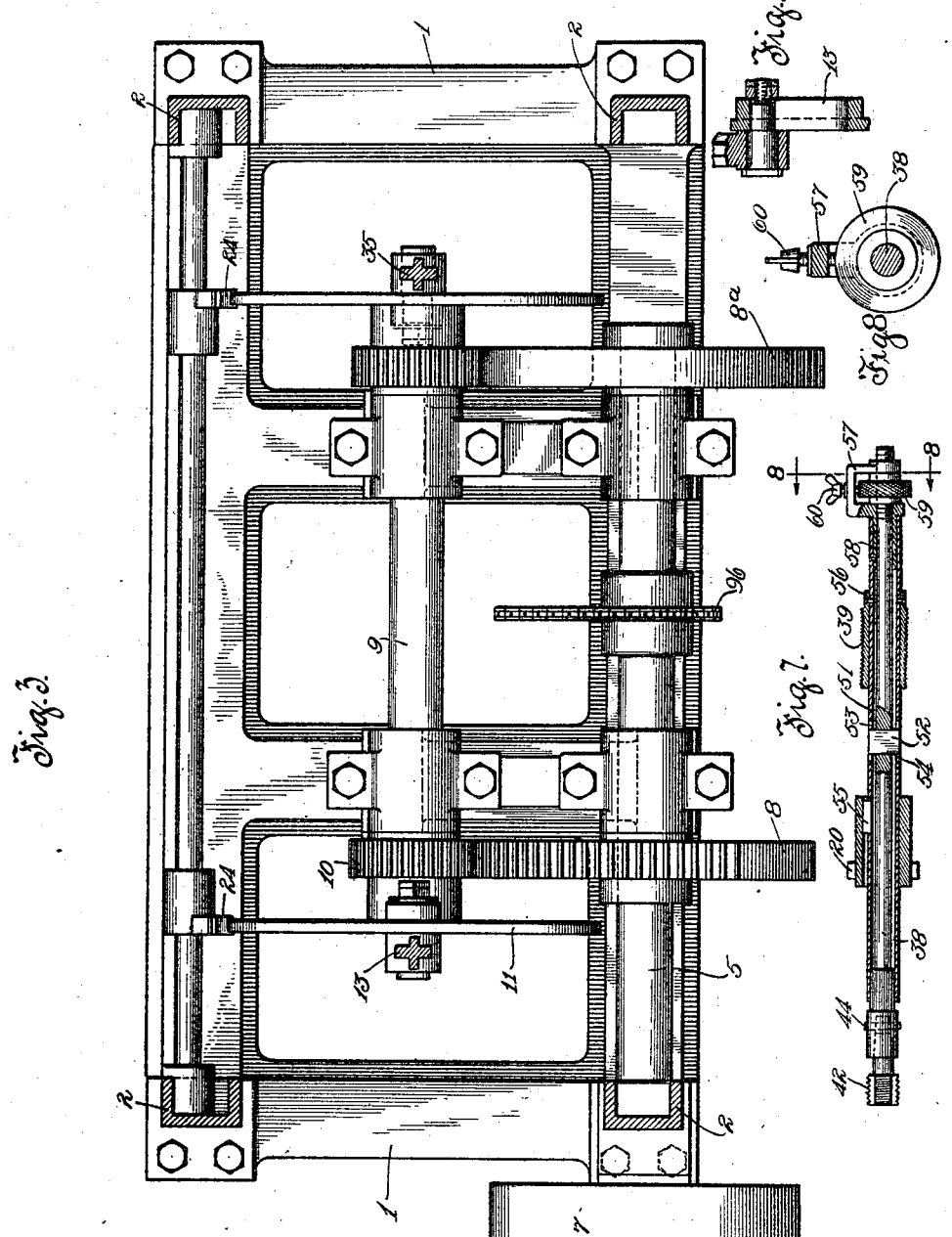

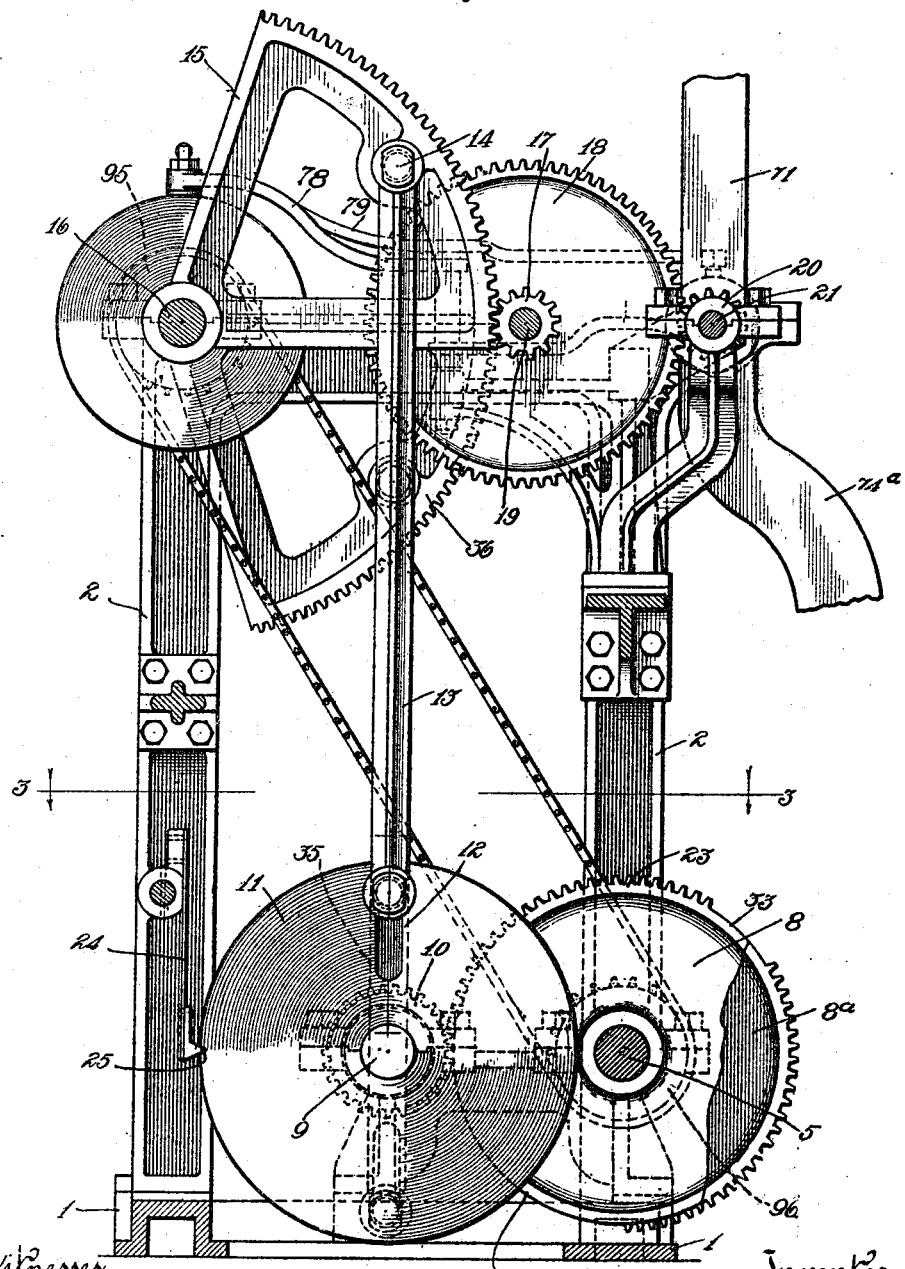

A. W. CARLSON.
NUT TAPPING MACHINE.
APPLICATION FILED JULY 23, 1914.
1,230,113.
Patented June 19, 1917.
6 SHEETS—SHEET 5.
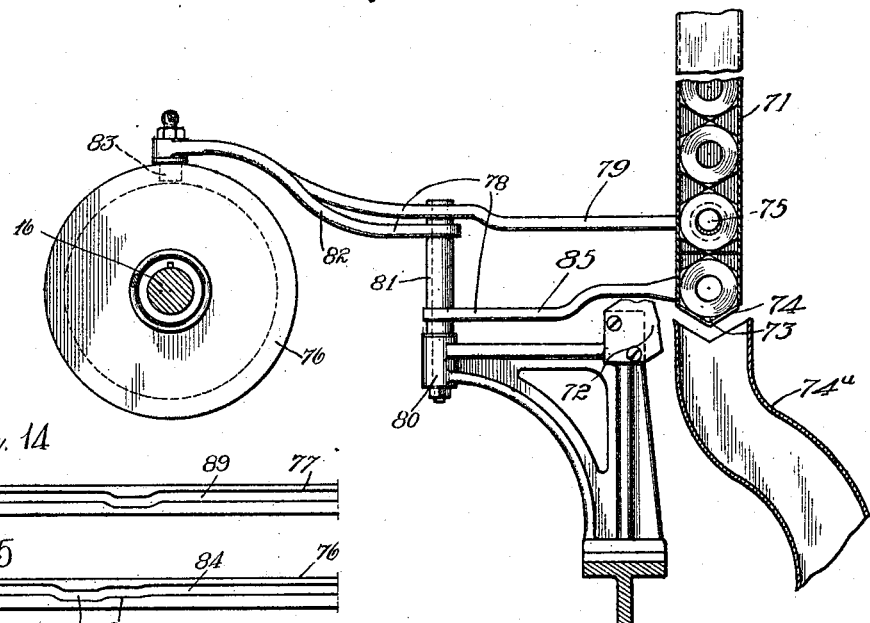
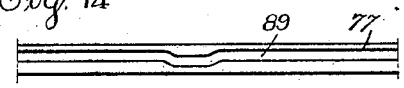
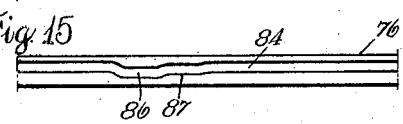
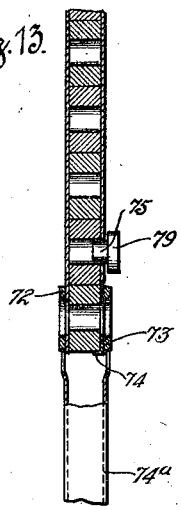
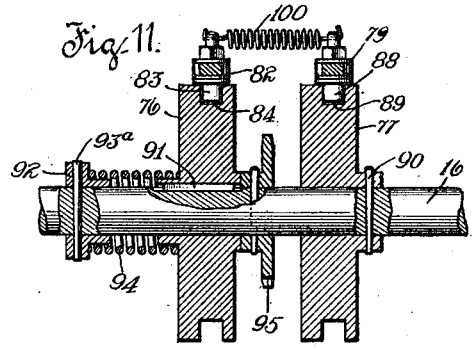
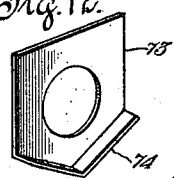
Witnesses:
Charles J. Cobb
Hatet F. Valen
Inventor:
Arthur W. Carlson
by Hill & Hill
Attys

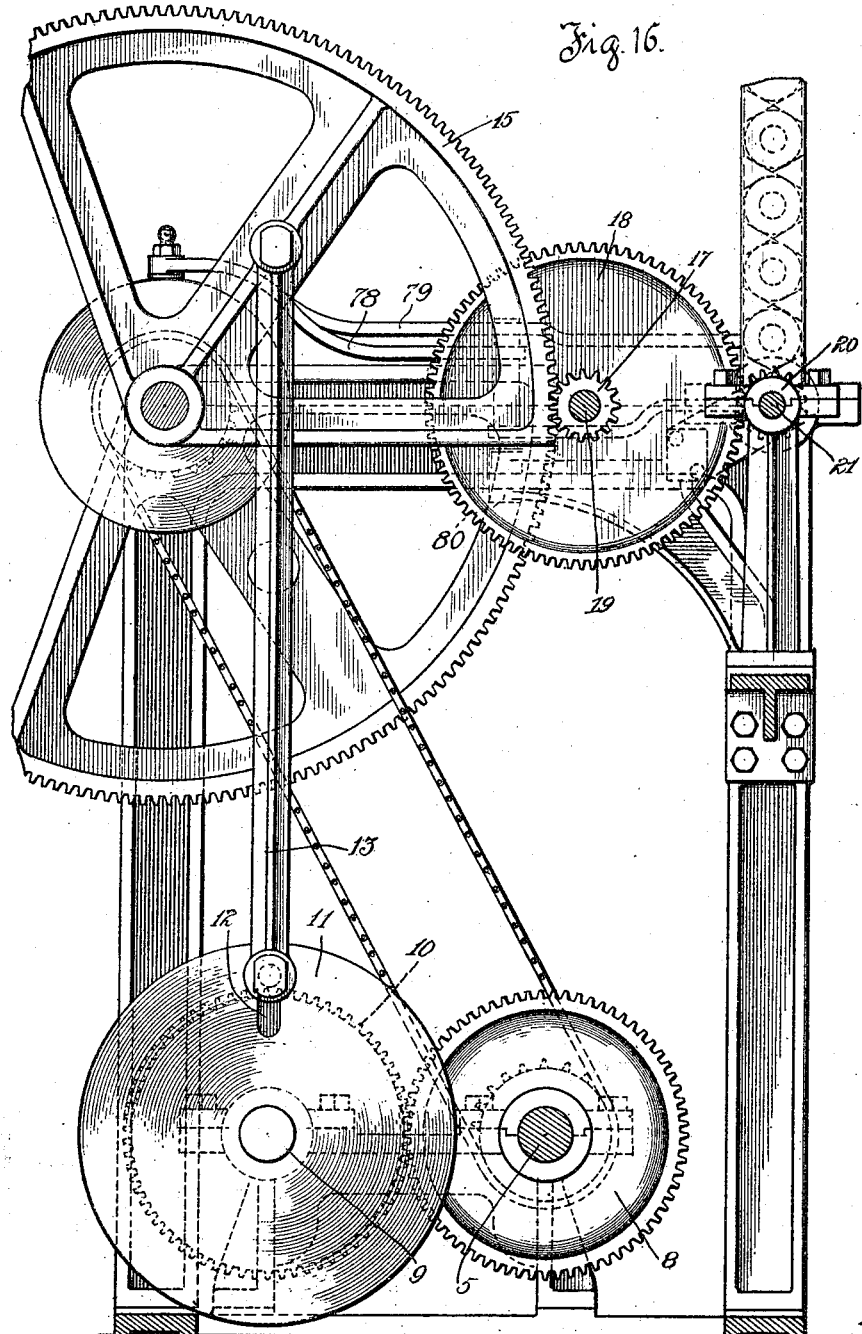

UNITED STATES PATENT OFFICE.

ARTHUR W. CARLSON, OF CHICAGO, ILLINOIS, ASSIGNOR TO GRIP NUT COMPANY, OF CHICAGO, ILLINOIS, A CORPORATION OF ILLINOIS.

NUT-TAPPING MACHINE.

1,230,113.  Specification of Letters Patent.  Patented June 19, 1917.

Application filed July 23, 1914. Serial No. 852,559.

*To all whom it may concern:*

Be it known that I, ARTHUR W. CARLSON, a citizen of the United States, residing at Chicago, in the county of Cook and State of Illinois, have invented certain new and useful Improvements in Nut-Tapping Machines, of which the following is a description.

My invention is particularly designed and constructed to tap bolt nuts from the opposite faces thereof, that is one tap operating from one direction will cut the threads in the nut from that face of the latter to partly complete the operation when it will be reversed and withdrawn, and a second tap operating from the opposite direction and entering the nut from the other face, will complete the operation of forming the peculiar thread therein.

By this means a slight variation in the form, depth or inclination of the threads as constructed from the two faces of the nut, or a slight lead of the thread in one section over that in the other section will result in producing a lock nut. It is obvious that this may be accomplished when only a slight lead of one section over the other is secured, or when the operation goes farther and the form of the thread is modified.

To this end my invention consists in the novel construction, arrangement and combination of parts herein shown and described, and more particularly pointed out in the claims.

In the drawings, wherein like reference characters indicate like or corresponding parts, Figure 1 is a plan view of my improved machine;

Fig. 2 is a partial front view of the same with parts broken away to show the construction;

Fig. 3 is a transverse horizontal section, substantially on the line 3, 3 of Fig. 4;

Fig. 4 is a partial transverse section on the line 4, 4 of Fig. 1;

Fig. 5 is a sectional view of a simple form of micrometer construction for accurately adjusting the position of the taps;

Fig. 6 is a transverse section through line 6, 6 of Fig. 5;

Fig. 7 is a longitudinal sectional view of another form of micrometer mechanism;

Fig. 8 is a cross section of the same on line 8, 8 of Fig. 7;

Figs. 9, 10, 11, 12, 13, 14 and 15 are detail views, some of which are partly in section to more clearly show the construction, and Fig. 16 is an elevation partly in section, corresponding in position to Fig. 4, illustrating a slightly modified construction.

In the drawings, 1, 1 form a suitable base frame for the machine provided with vertical columns 2, the whole of the connected parts providing a suitable frame for carrying the operating parts. Additional vertical columns 3, 3 are provided to support the bearings 4, 4 for the shafts of the taps.

As shown in Fig. 4, 5 is a power driven shaft by means of which the device is operated. As shown in Figs. 1 and 2, this shaft may be driven by means of the usual arrangement of tight and loose pulleys 6, 7.

It is obvious that each tap must be provided with its own mechanism, the two being so coördinated as to coöperate in cutting the nut, as described. Hence the two mechanisms are similar and arranged near the ends of the frame, as shown.

Referring to Figs. 3 and 4, the latter of which is as stated taken substantially on line 4, 4 of Fig. 1, it will be seen that the left hand tapping mechanism is there illustrated. Keeping this in mind, as well as the fact that the two mechanisms are substantially alike, we will proceed to describe this mechanism, as follows: Upon the shaft 5 is secured a gear wheel 8, which is driven therewith, and serves to impart motion to the other operating parts; 9 is a shaft, as shown parallel to the shaft 5, having secured thereto a cog wheel 10, meshing with coöperating teeth upon the periphery of the driving wheel 8. In the form shown the driving wheel 8 is provided with a mutilated gear for a reason which will be hereafter described.

Secured to the shaft 9 is also a wheel or disk 11, having formed therein an adjusting slot 12.

It is obvious that, if preferred, the shaft 5 may be placed at the rear of the machine instead of the front, as shown, the only object being that it shall be so arranged as to suitably drive the shaft 9. A suitable link 13 has its lower end adjustably secured to the wheel or disk 11 in any preferred manner, as by means of a wrist pin connection with the slot 12, as shown in Figs. 4 and 9. The upper end of the link 13 is pivotally connected as at 14 to a segment 15, loosely carried by the shaft 16, the teeth upon the periphery of the segment engaging with the teeth of the collar 17 of the cog wheel 18, which is loosely mounted upon the shaft 19. The teeth in the periphery of the cog wheel 18 mesh with the gear wheel 20, splined on the shaft 21, which is the shaft carrying the tap 22.

It is obvious that as the link 13 is reciprocated back and forth, the shaft 21, with its tap 22 will be alternately rotated first in one direction and then the other, the number of revolutions being dependent upon the distance the link 13 and connected segment 15 travel. This distance, however, is dependent upon the adjustment of the connection of the lower end of the link with the disk 11. As this connection approaches the center of the disk, the distance will become less, while as it approaches the periphery, the distance will be greater. The number of revolutions of the tap may thus be controlled as desired.

As shown in Fig. 4, the gear teeth 23 on the mutilated gear wheel 8 are designed to engage with the small cog wheel 10 on the shaft 9 in such a manner as to give said gear wheel and shaft one complete revolution, causing the link 13 to make one complete upward and downward reciprocation. Any preferred means of brake or locking device may be employed to bring the disk 11 to complete rest at a predetermined point, and positively maintain it in such position until it is again actuated. As shown, the spring dog 24 serves this purpose, coöperating with a notch 25 in the periphery of the disk 11. The part on the driving gear wheel 8, in which the gear teeth are removed, is designed to permit the gear wheel to pass by the gear 10 without actuating the latter, giving an interval of time for the coöperating mechanism at the other end of the machine to complete its cycle of movement. (The cogs shown in dotted lines are on the coöperating drive wheel at the other end of the machine.) The longitudinal movement of the shaft 21 carrying the tap 22 (left of Fig. 2) is secured by keying or otherwise securing the threaded sleeve 26 upon the shaft, which then coöperates with an internal coöperating threaded sleeve 27, secured in place upon the vertical frame of the machine by means of a set screw 28, or other suitable means. The character of the thread upon the parts 26 and 27 will regulate the longitudinal movement of the tap, which will also be controlled by the number of revolutions of the shaft governed by the adjustment of the link 13 with the disk 11. The parts 26 and 27 may readily be changed to others of different thread or lead, thus serving to control the longitudinal movement of the tap.

Any preferred means to present the nut at the proper point to be operated upon by the tap 22 may be employed. One effective means for this purpose will be described fully hereafter.

It is obvious, as thus far described, that the tap 22 may be employed to completely cut the thread in the nut if desired. It is also obvious that both the number of revolutions and the longitudinal distance the tap shall move are fully adjustable and under the control of the operator.

The opposite end of the machine is constructed in substantially the same manner to properly coöperate with the parts just described, to accomplish the result mentioned. The drive wheel 8$^a$ corresponds to the drive wheel 8, and as shown in Fig. 4, is positioned beyond the said wheel 8, at the other end of the machine. As shown, a slight interval between the alinement of the gear teeth on the periphery of the two drive wheels 8, 8$^a$, occurs, as at 33, (Fig. 4) which, in the construction illustrated, would provide a slight interval of time between the time when one of the taps ceases its operation and the other begins. The sections or broken portions, which substantially correspond in extent in both the driving wheels, as at 34, are, as shown, designed to provide an interval of time when both taps shall be released, and during which time the nut operated upon may be released and another nut positioned for cutting. This construction of a mutilated gear, however, is not mandatory, as it is obvious that the two taps may be in continuous movement, although the form shown is preferred, as will be explained hereafter. The link 35 (Figs. 2 and 3) corresponds to the link 13 at the other end of the machine, the segment 36 to the segment 15, the cog wheel 37 to the cog wheel 18, the shaft 38 to the shaft 21, the collar 39 to the collar 26, the sleeve 40 to the sleeve 27, and the set screw 41 to the set screw 28. The tap 42 also corresponds to the tap 22.

In a machine requiring such accuracy in the cutting of the thread as to secure the proper lead of the thread in one section of the nut to the thread in the other, to secure the desired results, it is advisable to employ some simple means of accurately adjusting one or both of the taps longitudinally. This may be accomplished in any preferred or well known way, or by adapting any of the micrometer adjusting devices to the connection between the tap and its shaft. As shown in Figs. 2, 5 and 6, this is accomplished in a simple manner by applying such device as the connection between the shaft 38 and the tap 42. As here shown, the tap 42 is carried upon a stud 43, which is suitably secured as by a key 44 to an adjusting block 45, which latter is splined to the sleeve 49. An extension 46 of the block has an aperture therein screw threaded, which receives the end of an adjusting bolt 47, carried by a shoulder 48 on a sleeve 49, keyed or otherwise secured to the shaft 38, so as to rotate therewith. A collar 50 on the bolt 47 coöperating with the head of the bolt, embraces the extension 48 on the collar 49, so that by turning the bolt the tap may be moved longitudinally to adjust the same as desired.

The micrometer construction for attachment to the tap may, if desired, be modified to longitudinally move the entire shaft 38. Such a construction is illustrated in Figs. 7 and 8. As there shown, the shaft 38 is positioned within a sleeve 51. A key 52 passes through both the shaft and the sleeve, causing the two to rotate together; the key is positioned in a suitable aperture through the shaft with its ends extended and positioned within the slots 53—54 in the sleeve, permitting the shaft to move longitudinally in the sleeve. The gear wheel 20 is secured to the sleeve by a spline 55. The sleeve 39 may be secured to the sleeve 51 in any preferred manner, as by a set screw 56. Upon the right hand end of the construction illustrated there is shown a yoke 57 provided with a sleeve 58, which is secured to the sleeve 51. Within the two arms of the yoke is positioned a thumb nut 59, which is screw threaded and engages the end of the shaft 38, as shown. By turning the thumb nut 59 it will be seen that the shaft may be longitudinally moved in the sleeve. Any preferred means may be employed to lock the thumb nut in adjusted position. As shown, a set screw 60 positioned in the yoke 57, has its end bearing upon the periphery of the thumb nut. Any other suitable means for this purpose may be employed, the object being to prevent the accidental movement of the thumb nut after the parts are suitably adjusted and set.
It will be seen that upon the opposite end of the shaft 38 is positioned the tap 42, pinned to an enlargement of the shaft 38 by means of the pin 44.

The means herein shown to present the nut blank to the tap may be described as follows, reference being had to Figs. 2, 4 and 10 to 15 respectively.

70 is any preferred form of hopper provided with suitable stirring means (not shown) in which the nuts may be placed and directed to a spout or chute 71, where they are properly positioned and presented between the two taps 22 and 42. At this point a fixed plate 72, Figs. 2 and 13, is positioned, against which the nut blank is pressed while being cut. On the opposite side is a plate 73 (Figs. 12, 2 and 13) provided with a ledge 74, upon which the nut blank rests while being cut. This plate is movable to and from the nut blank, serving to firmly press the latter against the plate 72, while being cut, and of being retracted to release the nut after the cutting operation is completed, permitting the finished nut to fall into the chute 74ª, which conducts it to any point desired. Immediately above the nut which is being cut, provision is made to engage the next nut blank in line, and maintain the same with the column of nut blanks thereabove until the first nut is suitably cut and released. As shown, this is accomplished by means of a movable stub 75, which partially enters the opening in the nut blank (Fig. 13) and serves to maintain the blank until the stub is retracted, releasing the blank and the column of nuts supported thereupon. The plate 73 and the stub 75 are in their movements controlled by the operation of suitable cams, so constructed and timed that the next succeeding blank and the column above it will be securely maintained in position until the blank operated upon is completely finished and released and the plate 73 is back in position to be engaged by and support the next succeeding blank.

As shown in Fig. 10, the shaft 16 illustrated in Fig. 4 as having the segments 15 and 36 loosely mounted thereon, has fixedly mounted upon it two cams 76 and 77. Only one of said cams is shown in Fig. 10, the other being directly back of it. They are both shown in Fig. 1 of the drawings, as well as in Fig. 11. Means for mounting them to rotate with the shaft 16 is also clearly illustrated in Fig. 11, and will be referred to hereafter. The guideways or operating grooves in the two cams are illustrated in Figs. 14 and 15, and will be referred to later.

Two levers 78 and 79 are pivotally supported upon a suitable stub as at 80 at a point between their ends, the first 78, as shown, being similar in form to a bell-crank lever, a connecting sleeve 81 connecting the two arms and loosely mounted on the stub 80. One arm 82 is extended to and engages with the cam 76, having a roller 83 positioned in the groove 84, the opposite end of the arm 85 being extended to engage with the retaining plate 73. The entire lever thus described composes the lever 78 before referred to. It will thus be obvious that the rotation of the cam 76 coöperating with the lever 78 described (bell-crank 82—85) will have the effect to contact with and firmly hold the nut blank against the plate 73 during the greater part of the revolution of said cam. As it reaches the point 86 the plate 73 will be withdrawn a sufficient distance to release the nut being tapped, which then falls into the chute 74ª. At that point the plate is controlled by the offset 87 in the cam, which advances the plate 73 again to a point where the next succeeding blank will fall upon the ledge 74 of the plate, and be correctly positioned for the next tapping operation. As the roller 83 passes out of the offset 87 into the main guideway of the cam, the plate 73 is again firmly pressed against the blank, pressing the same against the plate 72, and holding it in such position until the tapping operation is completed and the roller 83 again enters the offset 86, when the tapped nut is released and the operation is repeated. The retaining stub or pin 75 is controlled by the lever 79, which is also a bell-crank in form and supported upon the pivot 80, one end connected with the said pin 75 and the other end carrying a roller 88, which is positioned in the groove 89 in the cam 77. The operation is obvious, the two cams being so constructed and timed that the operation of the levers is as stated.

In the construction shown in Fig. 11, the cam 77 is pinned upon the shaft 16 by means of a pin 90 passing through a hub of the cam and the shaft. The cam 76, however, is preferably splined to the shaft, as shown at 91, allowing the cam to move longitudinally of the shaft slightly. As shown, a collar 92 is secured to the shaft by a pin 93ª, spring 94 being positioned between the collar and the cam. 95 is a sprocket wheel pinned to the shaft, and by means of which the latter is rotated. The construction described is preferred to make provision for any abnormally thick nuts or other irregular forms, providing a resilient pressure upon the face of the nut rather than a rigid unyielding pressure. The latter construction might in some cases prove destructive or bring unnecessary strain upon the parts.

The spring 100 connecting the ends of the levers 79 and 82 causes the rollers therein to contact with and follow the adjacent walls of the two cam grooves, insuring steadiness and uniformity of movement in operation.

As shown in Figs. 4 and 11, the said sprocket wheel 95 on the shaft 16 carries the upper end of a sprocket chain, which engages a similar sprocket wheel 96 carried on the shaft 5. This construction provides for a rotation of the shaft 16 controlled by the rotation of the shaft 5. These two shafts may therefore rotate in unison and at the same rate of speed, or one may be made to rotate more rapidly than the other by varying the size of the sprocket wheels.

As stated, the elevation shown in Fig. 16, corresponds in the drawing to the elevation illustrated in Fig. 4, and illustrates a slightly modified construction. As here shown, the driven shaft 5 has secured to it a gear wheel 8, provided with teeth about its periphery, as shown. The shaft 9 has mounted thereon a gear wheel 10, the teeth of which are engaged by the teeth of the driven gear 8. The gear wheel 10 carries therewith a disk 11, as shown in Fig. 4, having formed therein an adjusting slot 12, coöperating with the link 13, the upper end of which is pivotally connected as at 14 to the geared segment 15. As here illustrated, the segment 15 is larger than that shown in Fig. 4, and extends through a greater arc. The shaft 19 carries upon it the gear wheel 18, provided with a toothed gear 17, which gear is engaged by the teeth of the segment 15, also as shown in Fig. 4. The teeth upon the periphery of the gear wheel 18 engage the gear wheel 20 mounted on the shaft 21, which, as before stated, is the shaft carrying the tap 22.

The only actual difference in the operation of the construction here shown is that the two shafts carrying the taps are in continuous rotation, one of which will be advancing as the other is receding, said movement being alternated or reversed at regular periods to properly cut a nut held between the ends of the taps. As before stated, the constructions shown in Figs. 4 and 16 illustrate the mechanism near the left end of the machine, as shown in Fig. 1. The right hand or opposite end of the machine is provided with similar mechanism, coöperating to secure the results described.

It is therefore obvious that a machine may be constructed as first illustrated, in which the driving wheel is provided with a mutilated gear, and in which the taps are advanced to their work, withdrawn therefrom, and then be brought to a rest, during which the coöperating tap is doing its work, or the rotation of the taps may be continuous, as shown in Fig. 16. To provide the necessary clearance and permit the taps to operate in the manner last described, I have shown in Fig. 16 the segments 15 larger than those shown in Fig. 4, thereby securing a larger cog rack surface and rotating the shaft 19 and the parts dependent thereon to a greater distance than in the first instance shown in Fig. 4. This is desirable, owing to the fact that the taps are both in movement at the same time, and provision should be made for sufficient longitudinal movement to secure the proper clearance and the action described.

Having thus described my invention, it is obvious that various immaterial modifications may be made in the same without departing from the spirit of my invention, such modifications being apparent to those skilled in the art.

What I claim as new and desire to secure by Letters Patent is:—

1. In a machine of the character described the combination with nut supporting means, tapping means for forming differential threads upon a nut adjacent said supporting means, and mechanism for moving one of said means relative to the other to differentially thread the nut, substantially as described.

2. In a machine of the character described, the combination with nut supporting instrumentalities, of a plurality of taps, for forming differential threads upon a positioned nut, means for moving one of said taps a limited distance for threading only a portion of the positioned nut and for withdrawing said tap after its operation, and means for moving the other tap to thread the portion of the nut untouched by said first mentioned tap and for withdrawing said tap at a predetermined time, substantially as described.

3. In a machine of the character described, the combination with nut supporting instrumentalities, of alternately acting nut taps for forming differential threads upon a positioned nut adjacent said supporting instrumentalities, mechanism for moving one of said taps a predetermined limited distance for threading a portion of the positioned nut on one side and for withdrawing said tap after its operation, and mechanism for moving the other tap a predetermined distance to thread the opposite portion of the nut untouched by the first mentioned tap and for withdrawing said last mentioned tap after its operation, substantially as described.

4. In a machine of the character described, the combination with nut supporting instrumentalities, of alternately acting nut taps for forming differential threads upon a positioned nut adjacent said supporting instrumentalities, mechanism for moving one of said taps a predetermined limited distance for threading a portion of the positioned nut on one side and for withdrawing said tap after its operation, and mechanism for moving the other tap a predetermined distance to thread the opposite portion of the nut untouched by the first mentioned tap and for withdrawing said last mentioned tap after its operation, and means for varying the extent of movement of each of said taps.

5. In a machine of the character described, the combination with nut supporting instrumentalities, of opposed alternately acting taps, for forming differential threads upon a nut, mechanism for rotating and moving one of said taps a limited distance for threading only a portion of the positioned nut and for withdrawing said tap after its operation, and mechanism for rotating and moving the opposed tap to thread the portion of the nut untouched by said first mentioned tap and for withdrawing the same after its operation, substantially as described.

6. In a machine of the character described, the combination with nut supporting instrumentalities, of opposed alternately acting taps, for forming differential threads upon a nut, mechanism for rotating and moving one of said taps a limited distance for threading only a portion of the positioned nut and for withdrawing said tap after its operation, and mechanism for rotating and moving the opposed tap to thread the portion of the nut untouched by said first mentioned tap and for withdrawing same after its operation, and adjustable means for varying the movement of either of said taps.

7. In a machine of the character described the combination with nut supporting means, of tapping means for forming differential threads upon a nut adjacent said supporting means, mechanism for moving one of said means relative to the other to differentially thread the positioned nut, and means for varying the extent of movement between said supporting and tapping means.

8. In a device of the class described comprising a frame, a tapper shaft supported thereby, and mechanism for rotating the same, in combination with means for shifting the shaft bodily upon its rotation comprising an externally threaded sleeve secured to the shaft, a coöperating internally threaded sleeve secured to the frame and engaging the threads on the shaft sleeve, and means for adjustably securing the tap to the shaft whereby the relative longitudinal movement of the tap and shaft may be adjusted as desired.

9. In a machine of the character described the combination with a nut support, of a plurality of taps for forming differential threads upon a nut adjacent said support, means for changing the relative position of one of said taps and the support for threading a portion of the positioned nut, and means for changing the relative position of the other of said taps and the nut support for threading a portion of the nut, substantially as described.

10. In a device of the kind described, the combination with a frame, of rotatable shafts carrying taps thereon, means supported by the frame for rotating said shafts in combination with means for shifting each of said shafts bodily upon the rotation thereof comprising an externally threaded sleeve secured to each tapper shaft, a coöperating internally threaded sleeve secured to the frame and engaging the threads on the shaft sleeve, and means for adjustably securing the tap to the shaft whereby the relative longitudinal position of the tap and the shaft may be adjusted as desired so that a nut placed between the taps will be alternately engaged with the taps on opposite sides, substantially as described.

11. In a machine of the character described, the combination with nut supporting instrumentalities, of a plurality of taps for forming differential threads upon a positioned nut, means for moving one of said taps for threading a portion of the nut and for withdrawing a tap after its operation, and means for moving the other tap to thread a portion of the nut and for withdrawing said tap, substantially as described.

12. In a machine of the character described the combination with nut supporting instrumentalities, of a plurality of taps for forming differential threads upon a positioned nut adjacent said supporting instrumentalities, and mechanisms for differentially threading the nut by changing the relative positions of said supporting instrumentalities and the taps.

13. In a machine of the character described, the combination with nut supporting instrumentalities of tapping means for forming differential threads upon a positioned nut, means for moving one of said taps for threading a portion of the nut and for withdrawing said tap after its operation, means for moving the other tap to thread a portion of the nut and for withdrawing said tap, and means for varying the extent of movement of either of said taps, substantially as described.

14. In a machine of the character described, the combination with nut supporting instrumentalities, of tapping means for forming differential threads upon a positioned nut, a support for said tapping means, operating mechanism for actuating the tapping means for differentially threading the nut upon the changing of the relative positions of said tapping means and the nut supporting instrumentalities, and adjustable means for varying the different relative positions of the tapping means and the nut supporting instrumentalities.

In testimony whereof, I have hereunto signed my name in the presence of two subscribing witnesses.

ARTHUR W. CARLSON.

Witnesses:
JOHN W. HILL,
CHARLES I. COBB.

Copies of this patent may be obtained for five cents each, by addressing the "Commissioner of Patents, Washington, D. C."